Nov. 14, 1939.　　　P. GLEISSNER　　　2,180,046
CALENDERING MACHINE
Filed June 22, 1938　　　2 Sheets-Sheet 1
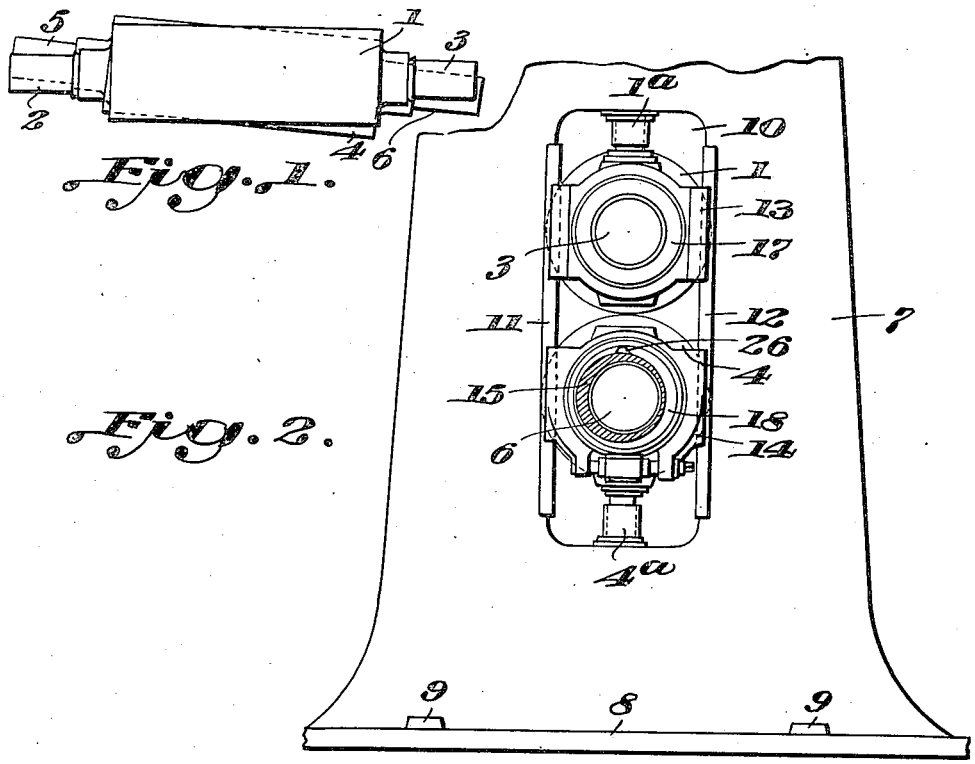
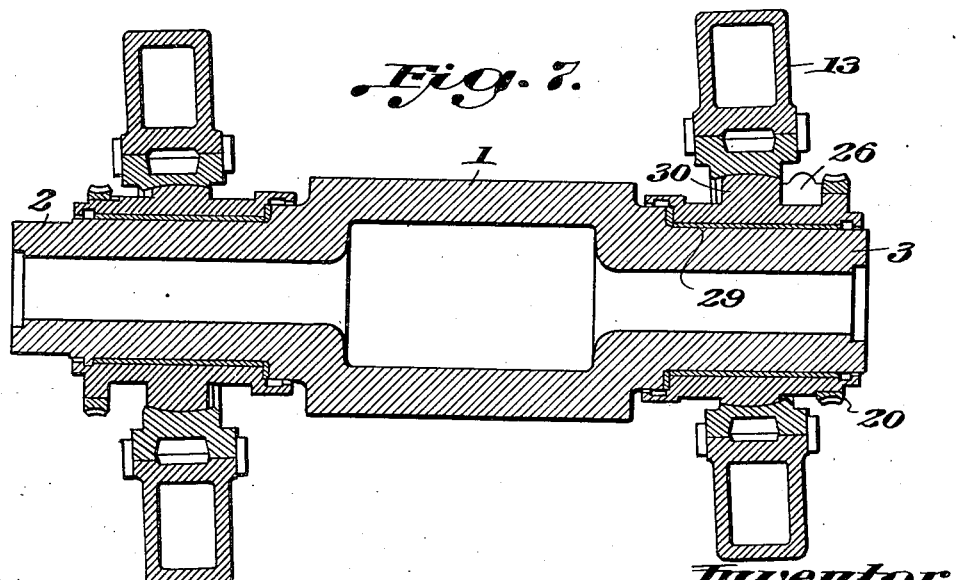
Inventor,
Paul Gleissner
By Young, Emery & Thompson
Attys.

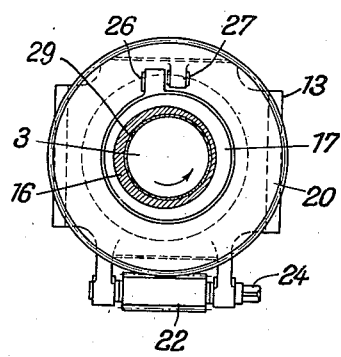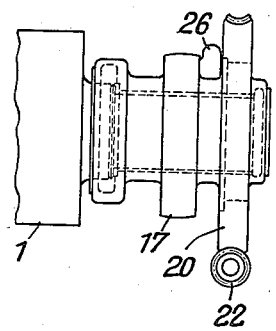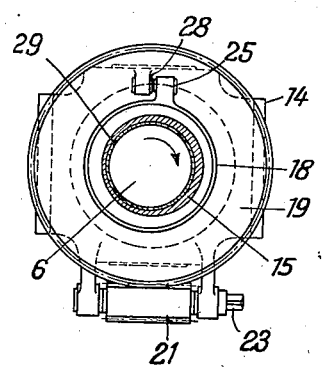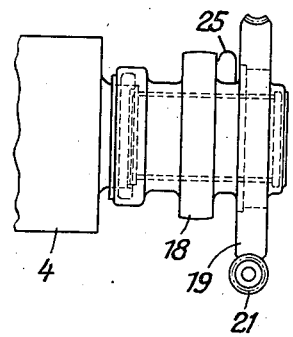

Patented Nov. 14, 1939

2,180,046

UNITED STATES PATENT OFFICE 2,180,046

CALENDERING MACHINE

Paul Gleissner, Dusseldorf, Germany

Application June 22, 1938, Serial No. 215,307
In Germany July 2, 1935

4 Claims. (Cl. 308—62)

This invention relates to calendering machines for the production of sheet rubber, and more particularly to means for adjusting the rollers of such machines.

Calendering machines have already been proposed, in which provision is made for inclined positioning of the rollers. The roller to which the requisite slant is to be imparted is mounted in two bearings furnished with slideways. The adjustment is effected by means of threaded spindles in a straight line and, since these machines have open frames, on the one side towards the frame and on the other side away from the frame.

In the production of sheet rubber, calendering machines are employed having a closed housing frame, the rollers, which are situated at the centre, transmitting the perpendicular roller pressure evenly to the uprights in the form of tensile stress. For additional reinforcement the uprights are made in one piece at the top and the bottom, and have openings of such width that the rollers can be passed laterally out of the machine between the uprights.

For the production of sheets the calendering rollers are adjusted in the conventional manner for a certain distance and the rubber is introduced in front of the rollers and gradually fed to the same, so that behind the rollers it emerges in the form of a sheet. The sheet thus produced must be of uniform thickness over its entire width, and particularly in the case of very thin sheets extreme accuracy is very essential, for the accomplishment of which the spacing between the rollers must be exactly equal during the production.

Experience has shown that during the operation the calendering rollers tend more or less to sag, so that the distance between the rollers is increased at the centre and reduced at the two ends. In order despite this to obtain a uniform thickness of the sheet the calendering rollers are cambered at the outset, so that under the pressure concerned the spacing between the rollers is exactly equal over the entire width. In the case of calenders operating with screw pressure or rigid pressure the roller pressure occurring cannot be readily ascertained, so that for proper cambering it is frequently necessary to make lengthy tests and thereupon to grind the rollers accordingly, for which purpose it is usual to employ a grinding apparatus fitted to the uprights in order to avoid the trouble involved in removing the rollers from the machine. When the correct camber has been found it will no longer be necessary when a harder or softer rubber mix is employed, to utilize a different roller pressure.

The invention relates to a calendering machine having a closed housing frame, in which the different cambering of the rollers necessary for avoiding different degrees of sag is replaced by an inclined positioning of the one roller to the other. By various degrees of obliquity it is possible to compensate any degree of sag on the part of the rollers. If the inclined positioning in the case of calendering machines having closed frames were carried out by means of straight slideways, it would be necessary for the purpose of obtaining sufficient adjustability to make the openings between the uprights unproportionately large, which would lead to a weakening of the entire frame. In addition, owing to the one-sided application of the force there occur in all slot guides of this nature the well known tilting effects, which lead to inaccuracies in the rolled product.

It is the object of the invention to overcome these drawbacks, and this is accomplished by the fact that in the case of a calendering machine having closed uprights the inclined positioning of the rollers is performed by means of eccentrically adjustable bearings, in which connection the bearing is never free, but is supported on all sides. In this way the opening in the uprights need merely be so large as just to permit of removal of the rollers. Further, all forces occurring are transmitted evenly by the bearings to the uprights without any tilting effect.

For adjusting the obliquity there is employed in the conventional manner a worm gear with adjustment spindle, the one bearing having its range of adjustment from zero towards the right and the other from zero towards the left.

An embodiment of the invention is illustrated by way of example in the accompanying drawings, in which Fig. 1 shows two superimposed calender rollers which are inclined in relation to one another.

Fig. 2 is an elevational view of a closed housing frame with built-in rollers according to Fig. 1, including the bearings.

Fig. 3 is a front view, partially in section, showing the bearing for the upper roller according to Fig. 2.

Fig. 4 is a front view, partially in section, showing the bearing for the lower roller according to Fig. 2.

Fig. 5 is an elevational view of the end of the roller with appertaining bearing according to Fig. 3, the bearing casing being removed.

Fig. 6 is an elevational view of the end of the roller with appertaining bearing according to Fig. 4 with the bearing casing removed.

Fig. 7 is a longitudinal sectional view of one of the rollers and the bearings.

Fig. 1 shows a roller 1 having trunnions 2 and 3. Below this roller 1 there is located, inclined thereto, the roller 4 having the trunnions 5 and 6.

Fig. 2 shows a closed housing frame 7, which by means of the plate 8 and the eyes 9 can be secured by bolts in the usual fashion to a bed (not shown).

In the frame 7 there is provided an opening 10 having lateral guide faces 11 and 12 for the vertically movable bearing casings 13 and 14. The upward and downward movement of these bearing casings 13 and 14 takes place in the conventional manner by means of adjusting devices 1a, 4a, whereby the separation of the rolls is variable, and does not constitute part of the invention. In the casings 13 and 14 there are supported the trunnions 3 and 6 of the rollers 1 and 4. In the sectional portions of Fig. 2 it is shown in conjunction with the lower roller 4 that the appertaining trunnion 6 of the roller 4 is located in an eccentric bearing sleeve 15.

Details relating to the mounting of the trunnions 3 and 6 in the bearing casings 13 and 14 are clearly shown in Figs. 3 to 6. The arrangement of course is such that the trunnions 2 and 5 of the rollers 1 and 4 according to Fig. 1 are mounted in a similar frame section as in Fig. 2.

The eccentric bearing sleeves 15 and 16 are applied in direct fashion to the trunnions 6 and 3 of the rollers 4 and 1. They are surrounded by the actual bearing rings 17, 18. The rings 17, 18 are firmly connected to worm wheels 19, 20 engaged by worms 21, 22, which with the assistance of suitable tools can be moved by the square heads 23, 24.

Between the bearing ring 18 and the worm wheel 19 firmly connected to these two parts, is a stop 25. Between the ring 17 and the worm wheel 20 according to Fig. 5, likewise firmly connected to both parts, is a stop 26.

As shown in Figs. 3 and 4, fixed stops 27, 28 are provided on the bearing casings 13 and 14.

The worm 22 (Fig. 3) is so moved by means of the square head 24 that the ring 17 is able to turn in the direction of the arrow, for such time until the stop 26 on the bearing ring, after traversing not quite 360°, bears against the stop 27. By actuation of the square head 23 the worm 21 can be so moved that the ring 18 (Fig. 4) moves in the opposite direction as indicated by the arrow for such time until the stop 25 moves against the stop 28.

It is accordingly possible by means of the arrangement illustrated in Figs. 3 to 6 to bring about the inclined position, as illustrated in Fig. 1, of the rollers mounted in a closed housing frame.

The parts 16 and 17 may also consist of one piece 30, in which case they represent an integral structure capable of moving in 13. The boring of 16, 17 then moves eccentrically with relation to the boring of 13 due to the contacting curved surfaces in axial direction of these parts as shown in Fig. 5.

Between the trunnion 3 or 6 and the part or parts 16, 17 or 15, 18 there can be provided a bearing bush 29, which if desired may also be replaced by any other bearing element, such as an anti-friction bearing.

It will be understood that due to the convex curved outer surface configuration of the bearing bushes 17 and 18 and the corresponding concave configuration of their seating surfaces in the bearing casings 13 and 14, the bearing bushes 17 and 18 can carry out pendulating movements in their associated bearing casings in accordance with the oblique or crossed position of the rollers 1 and 4. Therefore, the bearing pressure will be received uniformly by the bearing casings notwithstanding the oblique position of the rollers and the considerable length of the bearing surfaces.

What I claim as new and desire to secure by Letters Patent is:

1. In a calendering machine, a housing frame with a vertical guide slot therein, bearing casings slidably mounted in said guide slot in superposed arrangement, bearing bushes having bearing surfaces curved in the axial direction and by which they are supported in said bearing casings, said bushes having also eccentric bores, a pair of calender rollers each having a trunnion at each end thereof said trunnions at one end being journalled in said eccentric bores, means for rotatably adjusting the bearing bushes independently of each other in the bearing casings whereby the trunnions are adjustable in a direction at right angles to the guide surfaces with resulting inclination of the axes of the calender rollers one to the other, and means for varying the vertical position of said bearing casings in the guide slots to adjust the separation of said rollers, said last mentioned means being operable independently of the adjustment of the bearing sleeves.

2. In a calendering machine, a housing frame with a vertical guide slot therein, bearing casings slidably mounted in said guide slot in superposed arrangement, bearing bushes having bearing surfaces curved in the axial direction and by which they are supported in said bearing casings, said bushes having also eccentric bores, a pair of calender rollers each having a trunnion at each end thereof said trunnions at one end being journalled in said eccentric bores, means for rotatably adjusting the bearing bushes independently of each other in the bearing casings whereby the trunnions are adjustable in a direction at right angles to the guide surfaces with resulting inclination of the axes of the calender rollers one to the other, means for varying the vertical position of said bearing casings in the guide slots to adjust the separation of said rollers, said last mentioned means being operable independently of the adjustment of the bearing sleeves, and coacting stops on said bearing casings and bearing bushes, said stops being arranged to provide for opposite rotational adjustments of the bearing bushes of the superposed rollers.

3. In a calendering machine, a housing frame with a vertical guide slot therein, bearing casings slidably mounted in said guide slot in superposed arrangement, bearing bushes having bearing surfaces curved in the axial direction and by which they are supported in said bearing casings, said bushes having also eccentric bores, a pair of calender rollers each having a trunnion at each end thereof said trunnions at one end being journalled in said eccentric bores, means for moving the bearing sleeves in the bearing casings independently of each other to adjust the trunnions in a direction at right angles to the guide surfaces with resulting inclination of the axes of the calender rollers one to the other, and means for varying the vertical position of said bearing casings in the guide slots to adjust the separation of said rollers, said last mentioned means being operable independently of the adjustment of the bearing sleeves.

4. In a calendering machine, a housing frame with a vertical guide slot therein, bearing casings slidably mounted in said guide slot in superposed arrangement, bearing bushes having bearing surfaces curved in the axial direction and by which they are supported in said bearing casings said bushes having also eccentric bores, a pair of calender rollers each having a trunnion at each end thereof said trunnions at one end being journalled in said eccentric bores, means for moving the bearing sleeves in the bearing casings independently of each other to adjust the trunnions in a direction at right angles to the guide surfaces with resulting inclination of the axes of the calender rollers one to the other, means for varying the vertical position of said bearing casings in the guide slots to adjust the separation of said rollers, said last mentioned means being operable independently of the adjustment of the bearing sleeves, and co-acting stops on said bearing casings and bearing bushes, said stops being arranged to provide for opposite lateral adjustments of the bearing bushes of the superposed rollers.

PAUL GLEISSNER.